Nov. 21, 1961 A. BLAIN 3,009,263
EDUCATIONAL DEVICE
Filed Jan. 8, 1959 2 Sheets-Sheet 1
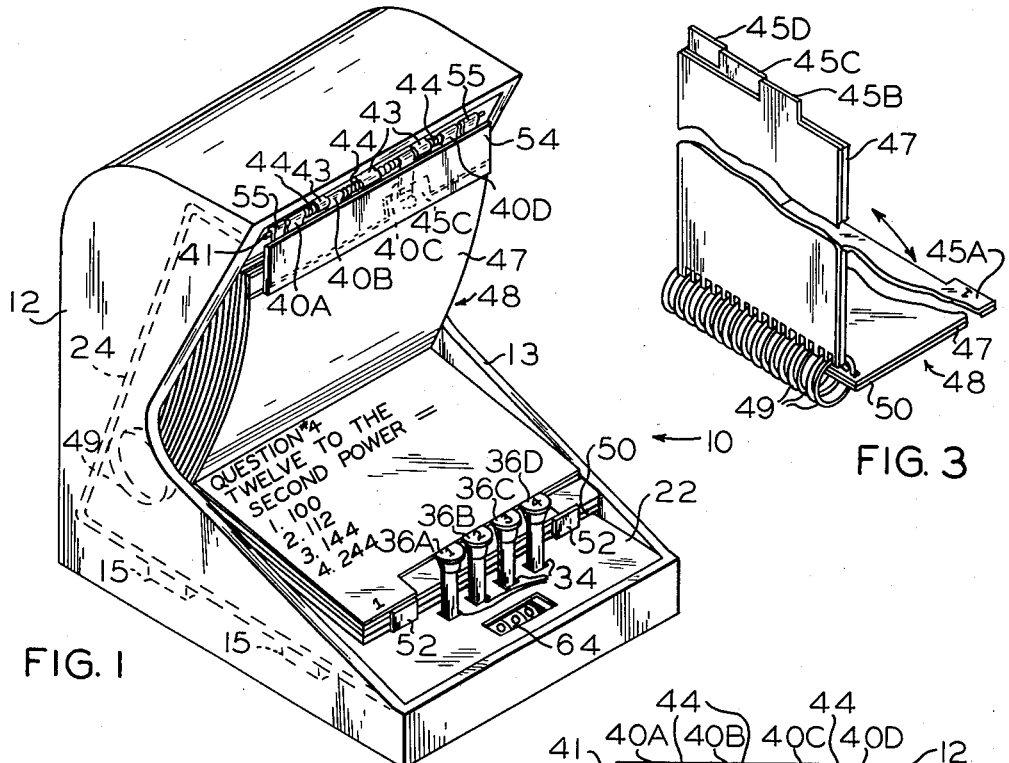
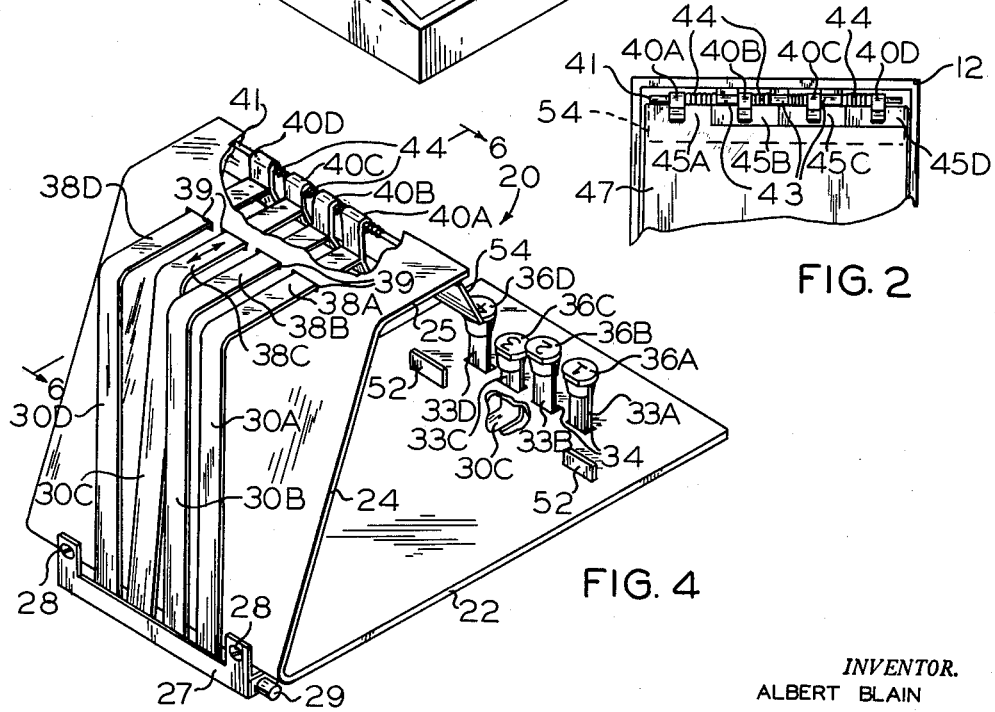
INVENTOR.
ALBERT BLAIN
BY Jacob Trachtman
ATTORNEY Nov. 21, 1961 A. BLAIN 3,009,263
EDUCATIONAL DEVICE
Filed Jan. 8, 1959 2 Sheets-Sheet 2
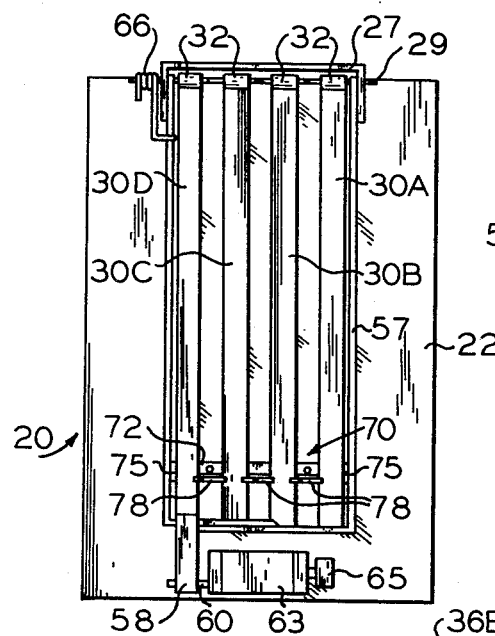
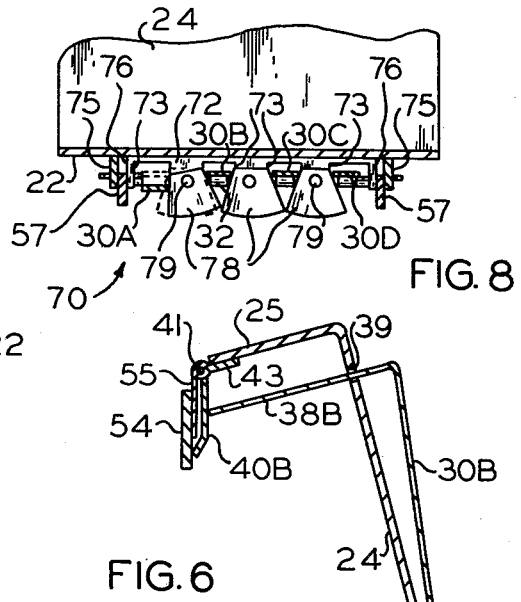
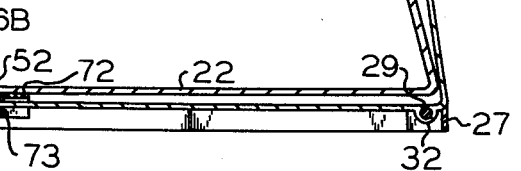
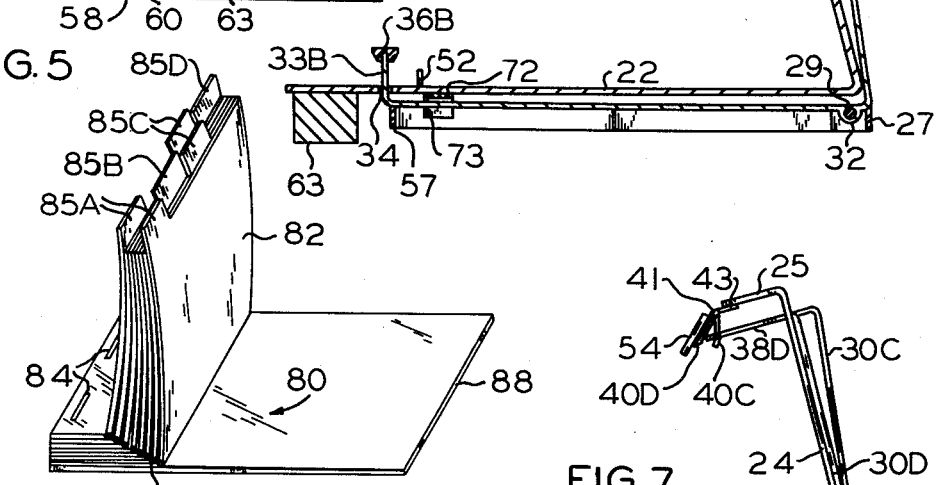
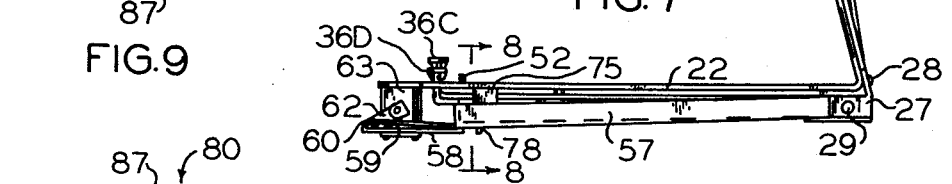
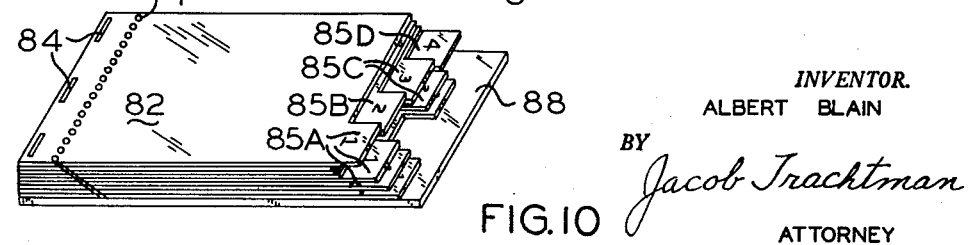
INVENTOR.
ALBERT BLAIN
BY Jacob Trachtman
ATTORNEY United States Patent Office 3,009,263
Patented Nov. 21, 1961

3,009,263
EDUCATIONAL DEVICE
Albert Blain, Philadelphia, Pa., assignor to General Atronics Corporation, Bala-Cynwyd, Pa., a corporation of Pennsylvania
Filed Jan. 8, 1959, Ser. No. 785,656
18 Claims. (Cl. 35—9)

This invention relates to education apparatus and, more particularly, to objective type self-teaching apparatus.

Objective type teaching methods have been widely used in schools and various other kinds of institutions, and have been found to be extremely effective. Some of these methods are particularly adaptable for rapid instruction procedures. It is therefore an object of the present invention to provide an educational device that may be conveniently used for such effective objective type instruction methods.

Another object of the present invention is to provide an objective type educational device in which various questions and respective multiple choice answers are imprinted upon a separate one of a complete stack of sheets, and each question is sequentially exhibited to the person being instructed as the correct answers are selected, whereby the next subsequent question will not be exhibited to this person until the previous question has been correctly answered.

An additional object of the present invention is to provide an instruction device of the above type that will enable the person being taught to selectively choose any one or all of the answers for a given question until such question has been correctly answered, following which the next question will be automatically exhibited, whereby a total score may be determined by the ratio of the number of answers selected relative to the total number of questions answered. This type of scoring is substantially more accurate than other types of testing methods since it enables the person being taught to choose an alternate answer in the event that the first answer is incorrect, whereby the benefit of learning the correct answer is not lost because such will be indicated in response to the selection of the correct answer on the second or subsequent attempt.

An additional object of the present invention is to provide an objective teaching device of the above type that employs a stack of sheets or cards upon which individual questions and multiple part answers are imprinted and includes its own indexing system for controlling the sequential exhibition of each subsequent sheet in response to the selection of the correct answer to each previous question, whereby the same machine may be used for all types of instruction without special adjustment for each series of questions and answers.

A more specific object of the present invention is to provide a test booklet that may be used with objective teaching apparatus of the type described in which each sheet has one surface upon which the question and multiple choice answers are imprinted, all of such sheets being secured together along one edge, and another edge of the stacked sheets is provided with indexing means sequentially controlling the exhibition of all questions to the person being taught.

All of the foregoing and still further objects and advantages of this invention will become apparent from a study of the following specification, taken in connection with the accompanying drawing, wherein:

FIGURE 1 is a perspective view of an educational device made in accordance with the present invention in operative use;

FIGURE 2 is a fragmentary front elevational view, with parts removed, of the device shown in FIGURE 1;

FIGURE 3 is a fragmentary perspective view of an instruction booklet forming a part of the present invention;

FIGURE 4 is an enlarged perspective view of the main operating assembly of the assembly shown in FIGURE 1;

FIGURE 5 is a bottom plan view of the operating assembly shown in FIGURE 4;

FIGURE 6 is an enlarged longitudinal cross sectional view taken along line 6—6 of FIGURE 4;

FIGURE 7 is a side elevational view of the assembly shown in FIGURE 4 with certain parts in an actuated position;

FIGURE 8 is an enlarged transverse cross sectional view taken along line 8—8 of FIGURE 7;

FIGURE 9 is a perspective view of a preferred form of instruction booklet, in an erect operative position; and FIGURE 10 is a view similar to FIGURE 9, showing the booklet in a folded storage position.

Referring now more in detail to the drawing, and more particularly to FIGURES 1 and 2 thereof, an educational device 10 made in accordance with the present invention is shown to include a main housing 12 having an enlarged cutout 13 adjacent to the front end thereof, through which the test questions, answer selecting elements, and scoring device may be observed. Inwardly extending projections 15 integral with the interior of the housing 12 serve to support the entire operating assembly 20 of the unit, which will now be more specifically described.

With further reference now to FIGURES 5 and 6 of the drawing, the operating assembly is shown to include a base plate 22 having an upwardly and forwardly inclined back plate 24 and forwardly extending roof plate 25, all of which form a rigid frame that is removably mounted within the housing 12. A bracket 27 detachably secured to the back plate 24 adjacent to the base plate 22, such as by screws 28, rotatably supports an elongated shaft 29. A plurality of levers 30A, B, C, D of a linkage system are pivotally supported upon the shaft 29 by means of individual bearings 32. One of the ends 33A, B, C, D of such levers extend upwardly through provided slots 34 in the base plate 22, upon which individually numbered buttons 36A, B, C, D are secured. The opposite ends of the operating levers are in the form of forwardly extending fingers 38A, B, C, D, all of which are slidably received within slots 39 provided in the back plate 24 adjacent to the upper extremity thereof.

A plurality of spaced apart stops 40A, B, C, D, pivotally carried upon a laterally extending shaft 41 secured to the roof plate 25 by means of brackets 43, are yieldably urged toward a substantially vertical position by means of individual torsion springs 44 that encircle the shaft 41 and act against the individual stops. These stops 40A, B, C, D extend into the path of movement of individual indicia or tabs 45A, B, C, D that extend outwardly from one of the ends of a plurality of question sheets 47 that are slidably mounted at their opposite ends upon a convoluted wire coil 49 to form a question test pad 48, all for purposes hereinafter more fully described.

As is more clearly shown in FIGURES 1, 2, and 4, of the drawing, the test pad 48 is mounted upon the base plate 22 by means of a rigid base sheet 50 that is positioned between the back plate 24 and a pair of upwardly extending stops 52. The pad 48 illustrated in FIGURE 1 of the drawing, shows the parts in proper position for the first question to be answered, with the question and multiple choice answers imprinted upon the upper surface of the lowermost sheet of the pad. In this position, a masking shield 54 pivotally supported by means of hangers 55 upon the shaft 41 effectively masks the tabs 45A, B, C, D to prevent a person from observing the location of the tabs, which, when released will indicate a correct answer to the questions under consideration. However, when the person taking the test depresses the proper button 36A, B, C, D corresponding to the correct multiple choice answer listed on the question sheet for the designated question, such as button No. 3, the associated lever 30C will effect forward movement of the actuating finger 38C to rock the depending stop 40C in a forward direction out of the path of movement of the tab 45C on the next subsequent sheet 47 of the test pad, as well as effecting forward movement of the masking shield 54, to allow such subsequent page 47 to drop into the exposed position on top of the first sheet. The tabs are so arranged that the dropping of each subsequent sheet is controlled by the proper answering of the question of the immediately preceding sheet. If the improper button is depressed, instead, the movement of another one of the stops 40A, B, C, D, will not affect the blocking position of the stop disposed in the path of movement of the tab located on the next subsequent sheet, so that the next question will not be exhibited to the person being tested. Thus, the tabs provide an index that is correlated with the correct answer to each question, the correctness of the answer to each question answered being determined by the position of the tab on the subsequent sheet. In order to ensure that only a single subsequent sheet will drop into position with each correct answer, however, the tabs on any immediately adjacent sheets should not be in the same relative position.

Each selection of the person being taught is automatically counted by a mechanical counter 63, of conventional construction. This counter has an operating lever 62 secured to an outwardly extending pin 60 that is slidably received within the slot 59 of a forwardly extending projection 58 of a counter frame 57. As is more clearly shown in FIGURES 5 and 7 of drawing, the counter frame 57 is hingedly supported upon the transverse shaft 29 for rocking movement in response to the downward movement of any one of the selector buttons 36A, B, C, D that are in overlying relationship therewith. A torsion spring 66 encircling a portion of the shaft 29 abuts the base plate 22 and frame 57 at opposite ends, so as to urge the frame 57 toward a normal elevated position, thus to automatically return the selector buttons to the raised initial position illustrated in FIGURE 1. However, a downward movement upon any one of these buttons is operative to depress the frame 57, thus actuating the counter 63 to advance the dial 64 thereof one unit, so that each selection of the person being taught is automatically recorded regardless of how many answers are selected for each question. As a result, this apparatus may also be used for testing purposes in which a perfect score for any test may be had by selecting a total number of answers exactly equal to the total number of questions answered. In the event that a person being tested is required to select more than one answer for any one question, the ratio of the number of answers selected with respect to the number of questions answered will exceed unity, thus indicating an imperfect score.

A safety mechanism 70 is provided for automatically preventing the downward movement of more than one selector button 36A, B, C, D at any one time. A plate 72 having a plurality of downwardly opening and laterally spaced apart slots 73 is secured to the bottom of the base plate 22, as is more clearly shown in FIGURES 6 and 8. Each of these slots 73 slidably accommodates the levers 30A, B, C, D for limited reciprocating vertical movement therewithin. Additional guide members 75 depending from the base plate 72 and spaced laterally from the ends of the plate 72 define guide slots 76 within which the side arms of the counter frame 57 are received. Segmental circular or trapezoidal shaped plates 78, pivotally mounted upon pins 79 carried by the reentrant plate 72, are normally disposed in the path of downward movement of the levers 30A, B, C, D. However, the downward movement of any one of these buttons and associated levers is operative to move the adjacent and subsequent plates 78 about the supporting pins 79, to provide sufficient clearance for the continued downward movement thereof which effects actuation of the associated depending stop member 40A, B, C, D and registration of such selection upon the counter 63. On the other hand, the clearance between the respective safety plates 78 will not accommodate the downward movement of more than one such lever 30A, B, C, D and will effectively block any attempt to depress more than one such selector button at a time. In the event that two or more such buttons are simultaneously depressed, the plates 78 will prevent the downward movement of all of such associated levers, so that the unit will not operate until only a single button is depressed.

It has been found that best results are obtained when each page quickly drops into a flat viewing position as soon as it is released. If each page does not lay flat, the drop of the following pages will not be complete and will cause a build up of loosely positioned pages that will eventually prevent the operator from viewing them. It is also necessary that each page drop at the same time rate to obtain accurate results when the operator is being timed or tested. Accordingly, a modified form of test booklet 80, illustrated in FIGURES 9 and 10, is shown to include a plurality of sheets 82. Each such sheet has a line of perforations 87 that is parallel to the outer or tab bearing edge and serves as a hinge to divide it into a stationary rear part and a rotatable forward part. The stationary parts of the sheets are bound together, such as by staples 84. The distance of the line of perforations to the outer edge is the same on all pages, while each page is extended outwardly slightly beyond the adjacent outer edge of each upper sheet, so that the lines of perforations form a biased or wedge shaped edge when viewed from the side. Included in the binding is a stiff supporting cover 88 which is trimmed along its rear edge with the trimming of the adjacent ends of the sheets following the binding operation.

As is more clearly shown in FIGURE 10 of the drawing, when the book is opened by rotating the rotatable parts of the sheets to a position normal to the stationary parts, the biased edge of the book formed by the perforations enables the tab ends of the pages to be in perfect alignment with each other. As a result, all of the tabs are automatically in a properly aligned position for release by the operating parts of the machine. In addition, each page has the same useable or printable area and the biased perforations permit each page to be held with a minimum of bending stress. This not only will make it easier for each page to be held up by its tab, but will also prevent permanent deformation of the pages so supported in the event that the book is retained within the machine for an extended period of time. The offsetting of the adjacent rows of perforations also overcomes the tendency for humping or bulging that ordinarily occurs when all pages are perforated at the same location so that the pad increases in thickness where the pages are creased along the perforations. The staggering of the perforations minimizes this humping and thus permits the pages to lie flat when released. Of great importance also, is the fact that a bias angle at the perforations is such as to provide an air space between the rotatable parts of adjacent sheets in the vicinity of the perforations when they are in the erect position. As a result sufficient air remains between adjacent sheets to prevent the formation of a suction type action that will interfere with the proper falling of the rotatable part of each sheet as it is released by the operating parts of the machine acting through the respective tabs 85A, B, C, D of the individual sheets. This bias angle is obtained by spacing the row of perforations on each sheet from the rows of perforations of the next adjacent sheets a distance greater than the thickness of each said sheet.

Of course, other types of binding may be used so long as a free edge or side of the individual pages of the pad is used to carry or support the indexing tabs that are correlated with the answers of the question on each preceding page of the pad.

In using the apparatus, any number of series of questions and answers may be made, simply by constructing test pads or booklets in accordance with the foregoing principles. The booklet is readily inserted into the testing unit without any adjustment of the operating parts. The depending spring-biased stops 40A, B, C, D and gravity actuated masking shield 54 serve as releasable stop means abutting the index means or tabs of the testing pad, blocking movement of all of the subsequent sheets of the pad to the exposed position until the proper selector button 36A, B, C, D which serves as a manually operated device for registering a choice of one of the answers to the exhibited problem, is depressed. When such proper selector button is depressed by the person being tested, the link system between such button and the depending stops, including the levers 30A, B, C, D serves as an actuating assembly for displacing the releasable stop elements from the aforementioned blocking engagement with the next subsequent problem sheet to release or set the next problem to be answered. As soon as the selector button is released, the torsion spring 44 returns the affected depending stop to the initial blocking position, while gravity returns the masking shield 54 to the corresponding vertical position, thus effectively masking the tab arrangement of subsequent sheets from view. If desired, more positive acting biasing means may be used to return the shield 54 to the initial blocking position, such as a spring or connecting link.

While the apparatus herein described and illustrated relates to the sequential exposure of problems to be answered to view, the present invention also contemplates apparatus in which more than one problem may be exposed to view with each one thereof being otherwise sequentially set or conditioned to be individually answered.

Therefore, while this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An educational device comprising, in combination, indicia means containing a plurality of single problems each having multiple choice answers, one of said problems being set to be answered, manually operated means for registering a choice of one of said answers to each said problem set to be answered, said indicia means having index means associated with the next subsequent problem and correlated with the correct answer to each problem set to be answered, and releasable means controlled by said manually operated means to release in cooperation with said index means and provide for setting a subsequent problem to be answered in response to the registration by said manually operated means of the correct answer to the immediately preceding problem in correlation with said index means.

2. An educational device comprising, in combination, indicia means having a plurality of sets of problems and multiple choice answers, one of said sets of problems being exposed to view, releasable means for keeping subsequent problems from view, manually operated means for registering a choice of said multiple choice answers to each exposed problem, said indicia means having index means associated with the next subsequent problem and responsive to said releasable means upon the registering of a correct answer to each exposed problem to expose the next subsequent problem and answer set to view.

3. An educational device for scoring the answers to a group of a plurality of single problems each having multiple choice answers comprising, in combination, a platform for supporting indicia means having a group of problems to be answered, releasable means for releasing and providing for setting one of the group of problems to be answered and keeping all other problems of the group from being answered, manually operated means for registering a choice of one of the answers to each said problem set to be answered, said indicia means having index means associated with the next subsequent problem and correlated with the correct answer to each problem interposed between said manually operated means and said releasable means, and actuating means controlled by said manually operated means releasing a subsequent problem to be answered in response to the registration of the correct choice of answer to the preceding problem through said index means by said manually operated means.

4. An educational device for scoring the answers to a group of single problems each having multiple choice answers, said testing device comprising, in combination, a platform, a set of problem sheets each having one upper surface bearing a single problem and multiple choice answers supported upon said platform, said upper surface of one of said problem sheets being in exposed position for exhibiting the problem and multiple choice answers carried thereby, manually operated means for registering a choice of one of the answers to each exhibited problem, index means integral with each said set of problem sheets correlated with the correct answer to each exhibited problem, releasable means supported by said platform abutting said index means and blocking the movement of all subsequent sheets to said exposed position, and actuating means controlled by said manually operated means withdrawing said releasable means from abutment with the index means of the next subsequent sheet in response to the registration by said manually operated means of the correct choice of answer to the preceding problem designated by said index means.

5. An educational device as set forth in claim 4, wherein each said set of problem sheets comprises a plurality of individual sheets each secured together along one edge and each having said problems and answers on one surface thereof, and said index means comprising a tab integral with one of a predetermined number of selected portions along another edge of each sheet.

6. An educational device as set forth in claim 5, wherein said releasable means comprises a plurality of stops pivotally carried by said platform each retractably overlying one of said predetermined positions adjacent to said other edge of said sheets, whereby movement of one of said stops out of abutment with the corresponding tab of the next subsequent problem sheet releases said next subsequent sheet for movement to said exposed position.

7. An educational device as set forth in claim 6, wherein said manually operated means comprises a plurality of push buttons carried by said platform, and said actuating means comprises a link system connecting each one of said push buttons to a corresponding one of said stops for effecting movement of each said stop in response to actuation of said respective push button.

8. An educational device as set forth in claim 7, further comprising a unit counting device, and link means actuated by said link system advancing said counter in response to each actuation of said push buttons.

9. An educational device as set forth in claim 8, wherein said link system further comprises motion limiting means automatically preventing movement of all of said push buttons in response to simultaneous manual actuation of more than one of said push buttons.

10. An educational device as set forth in claim 6, further comprising a housing, said platform being supported within said housing, said housing defining a forwardly opening cutout exposing said platform and said push buttons together with said sheets, said other edge of said sheets having elevated above said one edge thereof, and said stops overlying the front of said other edge of said sheets in abutment with said tabs.

11. An educational device as set forth in claim 10, further comprising a shield pivotally carried by said platform in overlying masking relationship with said stops and said tabs, biasing means normally urging said shield toward a vertical position, and said shield being displaceable out of the path of movement of said other edge of said sheets against the action of said biasing means in response to actuation of any one of said stops.

12. An educational device comprising, in combination, a plurality of single problems each having multiple choice answers, index means correlated with the correct answer to each problem, manually operated means for registering a choice of one of said multiple choice answers to each problem to be answered, said index means setting a subsequent problem to be answered in response to registration to the correct answer choice by said manually operated means, a plurality of sheets, each one of said problems being imprinted upon one of said sheets together with said multiple choice answers, said index means comprising a predetermined marginal portion of each said sheet, said manually operated means comprising a plurality of stops normally disposed in the path of movement of said marginal portion of said index means, and means for retracting selected ones of said stops from the path of movement of said marginal portion of said index means of each subsequent sheet.

13. An educational device as set forth in claim 12, wherein said indicia comprises at least one tab projecting outwardly from a common marginal edge of each of said sheets, the positions of the tab of each subsequent sheet corresponding to the position of one of said stops correlated to the correct answer to the problem on each preceding sheet.

14. An educational device as set forth in claim 13, wherein all of said sheets are juxtaposed in a single stack, and hinge means securing said stack of sheets together along a marginal portion spaced from said index means.

15. A test pad comprising a set of individual problem sheets hingedly secured together along one edge, each one of said sheets having a single problem and a plurality of multiple choice answers carried on one side, a tab integral with a selected one of a plurality of selected positions along another common edge of each sheet, the quantity of said positions being at least equal in number to the number of said multiple choice answers, and the correct answer to the problem carried on each sheet being correlated to the position of the tab on the next subsequent problem sheet.

16. A test pad as set forth in claim 15, wherein each said problem sheet includes a row of perforations forming a hinge extending parallel to said other hinge of each said sheet and dividing each said sheet into a stationary part and a rotatable part, said other edge of each lower sheet extending outwardly beyond said other edge of each upper sheet, and the distance between said row of perforations and said other edge of each sheet being constant for all of said sheets, whereby rotation of said rotatable sheet parts about said respective rows of perforations to an operative position substantially normal to said stationary sheet parts effects alignment of all of said other edges of said sheets.

17. A test pad as set forth in claim 16, wherein said row of perforations on each sheet is parallel to said row of perforations on each adjacent sheet and is spaced apart therefrom a distance greater than the thickness of each said sheet, whereby rotation of said rotatable sheet parts about said respective rows of perforations to said operative position effects shifting of adjacent rotatable sheet parts into spaced relationship with each other in the vicinity of said rows of perforations.

18. A test pad as set forth in claim 17, wherein said row of perforations on each sheet is spaced an equal distance apart from the row of perforations on each next adjacent sheet in a common direction, all of said rows of perforations lying in a common plane, said plane defining an acute bias angle with the general plane of said sheets in all positions of said rotatable sheet parts.

References Cited in the file of this patent

UNITED STATES PATENTS

| | | |
|---|---|---|
| 647,218 | Christiansen | Apr. 10, 1900 |
| 1,670,480 | Pressey | May 22, 1928 |
| 1,749,226 | Pressey | Mar. 4, 1930 |
| 2,137,447 | Ellis | Nov. 22, 1938 |
| 2,340,251 | Nesbit | Jan. 25, 1944 |
| 2,524,704 | Henderson | Oct. 3, 1950 |
| 2,799,955 | Neilsen | July 23, 1957 |
| 2,911,741 | Boyer | Nov. 10, 1959 |

FOREIGN PATENTS

| | | |
|---|---|---|
| 758,904 | France | Nov. 7, 1933 |